United States Patent
Kim et al.

(10) Patent No.: US 12,411,517 B2
(45) Date of Patent: Sep. 9, 2025

(54) PEDAL SIMULATOR

(71) Applicant: HL MANDO CORPORATION, Gyeonggi-do (KR)

(72) Inventors: Heejun Kim, Gyeonggi-do (KR); Sungjun Hong, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 18/632,233

(22) Filed: Apr. 10, 2024

(65) Prior Publication Data

US 2024/0345615 A1 Oct. 17, 2024

(30) Foreign Application Priority Data

Apr. 11, 2023 (KR) .................. 10-2023-0047552
Mar. 26, 2024 (KR) .................. 10-2024-0041106

(51) Int. Cl.
*G05G 5/03* (2008.04)
*B60T 7/04* (2006.01)
*G05G 5/05* (2006.01)

(52) U.S. Cl.
CPC ............. *G05G 5/03* (2013.01); *B60T 7/042* (2013.01); *B60T 2220/04* (2013.01); *G05G 5/05* (2013.01); *G05G 2505/00* (2013.01)

(58) Field of Classification Search
None
See application file for complete search history.

(56) References Cited

U.S. PATENT DOCUMENTS

2022/0332296 A1* 10/2022 Eriksen .................... G05G 1/46
2022/0396255 A1* 12/2022 Schlangen .............. B60T 17/08

FOREIGN PATENT DOCUMENTS

KR          10-0654335          12/2006

* cited by examiner

*Primary Examiner* — Vicky A Johnson
(74) *Attorney, Agent, or Firm* — WOMBLE BOND DICKINSON (US) LLP (57) ABSTRACT

A pedal simulator is disclosed. The pedal simulator, which is a pedal simulator providing a pedal effort to a pedal of a vehicle, may include: a housing; a piston of which at least a portion of a front is disposed in the housing and which is connected to the pedal to move forward or rearward according to the behavior of the pedal; a displacement member connected to the piston, disposed in the housing, and configured to be displaced together with the piston; and a sensor disposed to detect the displacement of the displacement member.

18 Claims, 7 Drawing Sheets

PEDAL SIMULATOR

CROSS-REFERENCE TO RELATED APPLICATION

This application claims priority to and the benefit of Korean Patent Application No. 10-2023-0047552, filed on Apr. 11, 2023, Korean Patent Application No. 10-2024-0041106, filed on Mar. 26, 2024, the disclosures of which are incorporated herein by reference in its entirety.

BACKGROUND

1. Field of the Invention

The present disclosure relates to a pedal simulator, and more particularly, to a pedal simulator that provides a pedal effort to a pedal of a vehicle.

2. Discussion of Related Art

Pedal simulators that provide a corresponding reaction force, that is, a pedal effort, when a driver steps on a pedal may be disposed in vehicles. For example, a pedal simulator may be disposed in a brake system of a vehicle to form a brake pedal effort. Generally, a pedal simulator includes components such as a damper, a piston, and a spring to form a pedal effort.

Conventional pedal simulators only have components for forming a pedal effort and do not have components for detecting a pedal displacement. Accordingly, a separate stroke sensor is mounted on a pedal to detect the movement or displacement of a pedal.

However, such an external sensor has a structure connected to a pedal of a vehicle through a link and thus has a limitation in that it is actually impossible to secure redundancy. In recent years, redundancy of various sensors has become essential with the development of autonomous vehicle driving technology, and thus development of technology that can overcome structural limitations of the conventional pedal simulators is necessary.

(Patent Document) Korean Patent Registration No. 0654335, "Installation structure of pedal stroke sensor," Date of Registration: Nov. 29, 2006)

SUMMARY OF THE INVENTION

The present disclosure is directed to providing a pedal simulator having both a component forming a pedal effort and a component detecting a pedal displacement of a vehicle.

The present disclosure is also directed to providing a pedal simulator that can effectively detect a pedal displacement of a vehicle without being connected to the pedal of the vehicle through a link.

The present disclosure is also directed to providing a pedal simulator that allows redundancy to be secured in relation to detecting a pedal displacement of a vehicle.

The present disclosure is also directed to providing a pedal simulator that facilitates assembly in a manufacturing process.

The objects of the present disclosure are not limited to the above-described objects, and other objects that are not mentioned will be able to be clearly understood by those skilled in the art to which the present disclosure pertains from the following description.

According to an aspect of the present disclosure, there is provided a pedal simulator providing a pedal effort to a pedal of a vehicle, the pedal simulator including: a housing; a piston of which at least a portion of a front is disposed in the housing and which is connected to the pedal to move forward or rearward according to the behavior of the pedal; a displacement member connected to the piston, disposed in the housing, and displaced together with the piston; and a sensor disposed to detect the displacement of the displacement member.

In the pedal simulator according to an aspect of the present disclosure, the sensor may be disposed in contact with an outer surface of the housing.

In the pedal simulator according to an aspect of the present disclosure, the displacement member may include a magnet, and the sensor may detect a change in a magnetic field according to a change in position of the displacement member.

In the pedal simulator according to an aspect of the present disclosure, the displacement member may further include a holder in which the magnet is disposed and which is coupled to an outer circumferential surface of the piston.

In the pedal simulator according to an aspect of the present disclosure, the housing may include a first chamber in which the piston is disposed and a second chamber formed parallel to the first chamber and in which the displacement member is disposed.

In the pedal simulator according to an aspect of the present disclosure, a long groove may be disposed between the first chamber and the second chamber, and the displacement member may be disposed to pass through the long groove.

In the pedal simulator according to an aspect of the present disclosure, the piston may include a piston head formed in a cylindrical shape and a piston body connected to a rear of the piston head and connected to the pedal.

In the pedal simulator according to an aspect of the present disclosure, the piston head may include a first outer diameter portion having a first outer diameter, a second outer diameter portion having a second outer diameter larger than the first outer diameter, disposed at a rear of the first outer diameter portion, and forming a support step on a boundary with the first outer diameter portion, and a third outer diameter portion having a third outer diameter larger than the second outer diameter, protruding radially outward, and disposed at a rear of the second outer diameter portion.

In the pedal simulator according to an aspect of the present disclosure, the piston head may further include a fourth outer diameter portion having a fourth outer diameter smaller than the first outer diameter and disposed at a front of the first outer diameter portion.

The pedal simulator according to an aspect of the present disclosure may further include a ring-shaped member having an inner diameter corresponding to the first outer diameter, fitted and coupled to the first outer diameter portion, having a rear supported by the support step, and forming a groove, to which the displacement member is able to be fitted and coupled, together with the third outer diameter portion.

In the pedal simulator according to an aspect of the present disclosure, the ring-shaped member may include a ring-shaped body having an inner diameter corresponding to the first outer diameter and fitted and coupled to the first outer diameter portion, and a flange protruding radially outward from the ring-shaped body.

The pedal simulator according to an aspect of the present disclosure may further include a spring disposed in the housing to be compressed according to forward movement of the piston, and the spring may have a rear seated on the flange to press the flange rearward.

The pedal simulator according to an aspect of the present disclosure may further include a reaction force damper disposed in the housing and configured to provide a reaction force relative to the forward movement of the piston.

According to another aspect of the present disclosure, there is provided a pedal simulator including: a housing; an input shaft connected to a pedal of a vehicle to behave according to the displacement of the pedal; a piston of which at least a portion of a front is disposed in the housing and which is connected to the input shaft to move forward or rearward according to the behavior of the input shaft; a reaction force damper disposed in the housing and configured to provide a reaction force relative to the forward movement of the piston; a displacement member connected to the piston, disposed in the housing, and displaced together with the piston; and a sensor disposed to detect the displacement of the displacement member.

In the pedal simulator according to another aspect of the present disclosure, the sensor may be disposed in contact with an outer surface of the housing.

In the pedal simulator according to another aspect of the present disclosure, the displacement member may include a magnet, and the sensor may detect a change in a magnetic field according to a change in position of the displacement member.

In the pedal simulator according to another aspect of the present disclosure, the displacement member may further include a holder in which the magnet is disposed and which is coupled to an outer circumferential surface of the piston.

In the pedal simulator according to another aspect of the present disclosure, the housing may include a first chamber in which the piston is disposed and a second chamber formed parallel to the first chamber and in which the displacement member is disposed.

In the pedal simulator according to another aspect of the present disclosure, a long groove may be disposed between the first chamber and the second chamber, and the displacement member may be disposed to pass through the long groove.

In the pedal simulator according to another aspect of the present disclosure, the piston may include a piston head formed in a cylindrical shape and a piston body connected to a rear of the piston head and connected to the input shaft, and the piston head may include a first outer diameter portion having a first outer diameter, a second outer diameter portion having a second outer diameter larger than the first outer diameter, disposed at a rear of the first outer diameter portion, and forming a support step on a boundary with the first outer diameter portion, and a third outer diameter portion having a third outer diameter larger than the second outer diameter, protruding radially outward, and disposed at a rear of the second outer diameter portion.

In the pedal simulator according to another aspect of the present disclosure, the piston head may further include a fourth outer diameter portion having a fourth outer diameter smaller than the first outer diameter and disposed at a front of the first outer diameter portion.

The pedal simulator according to another aspect of the present disclosure may further include a ring-shaped member having an inner diameter corresponding to the first outer diameter, fitted and coupled to the first outer diameter portion, having a rear supported by the support step, and forming a groove, to which the displacement member is able to be fitted and coupled, together with the third outer diameter portion.

In the pedal simulator according to another aspect of the present disclosure, the ring-shaped member may include a ring-shaped body having an inner diameter corresponding to the first outer diameter and fitted and coupled to the first outer diameter portion, and a flange protruding radially outward from the ring-shaped body.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present disclosure will be described in detail so that those skilled in the art to which the present disclosure pertains can easily carry out the embodiments. The present disclosure may be implemented in many different forms and is not limited to the embodiments described herein. In order to clearly describe the present disclosure, portions not related to the description are omitted from the accompanying drawings, and the same or similar components are denoted by the same reference numerals throughout the specification.

The words and terms used in the specification and the claims are not limitedly construed as their ordinary or dictionary meanings, and should be construed as meaning and concept consistent with the technical spirit of the present disclosure in accordance with the principle that the inventors can define terms and concepts in order to best describe their invention.

In the specification, it should be understood that the terms such as "comprise" or "have" are intended to specify the presence of features, numbers, steps, operations, components, parts, or combinations thereof described in the specification and do not preclude the possibility of the presence or addition of one or more other features, numbers, steps, operations, components, parts, or combinations thereof.

Figure 1:
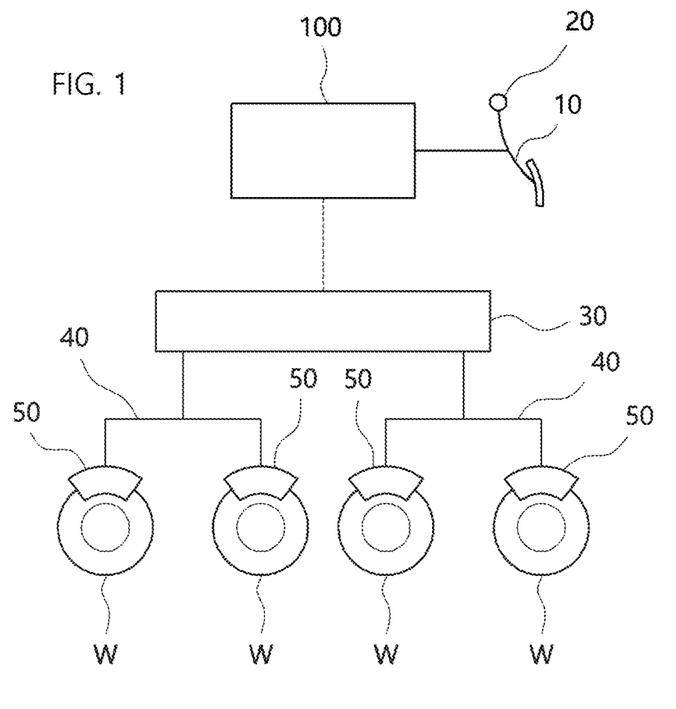
FIG. 1 is a view illustrating a configuration of a brake system of a vehicle in which a pedal simulator according to one embodiment of the present disclosure is disposed.

FIG. 1 is a view illustrating a configuration of a brake system of a vehicle in which a pedal simulator according to one embodiment of the present disclosure is disposed.

A pedal simulator 100 is disposed in a vehicle. The pedal simulator 100 provides a corresponding reaction force, that is, a pedal effort, when a driver steps on a pedal 10.

Referring to FIG. 1, the pedal simulator 100 may be disposed in a brake system of the vehicle. More specifically, the pedal simulator 100 may be disposed in the brake system of the vehicle and provide a pedal effort to the brake pedal 10.

The pedal simulator 100 has both a component forming the pedal effort of the brake pedal 10 and a component detecting a displacement of the brake pedal 10. Accordingly, the pedal simulator 100 can not only provide a reaction force corresponding to the movement of the brake pedal 10 but also detect the displacement (movement) of the brake pedal 10.

Meanwhile, a separate displacement sensor 20 may be disposed near the brake pedal 10, separately from the pedal simulator 100, in the brake system of the vehicle. For example, the displacement sensor 20 may be an angle sensor configured to detect an angle of the brake pedal 10.

According to the present disclosure, since the component detecting the displacement of the brake pedal 10 is disposed in the pedal simulator 100, and the separate displacement sensor 20 is provided near the brake pedal 10 separately from the pedal simulator 100, redundancy can be secured in detecting the displacement of the brake pedal 10.

Meanwhile, displacement information of the brake pedal 10 that is detected by the pedal simulator 100 or the displacement sensor 20 may be transmitted to a pump 30 configured to generate a hydraulic brake pressure. The pump 30 may generate a hydraulic brake pressure that corresponds to the displacement information.

Also, the hydraulic brake pressure generated by the pump 30 may be supplied to a brake 50 disposed near a wheel W of the vehicle through a hydraulic circuit 40. Braking of the vehicle may be performed as the brake 50 operates due to the hydraulic brake pressure.

Hereinafter, the pedal simulator 100 according to one embodiment of the present disclosure will be described in detail.

Figure 2:
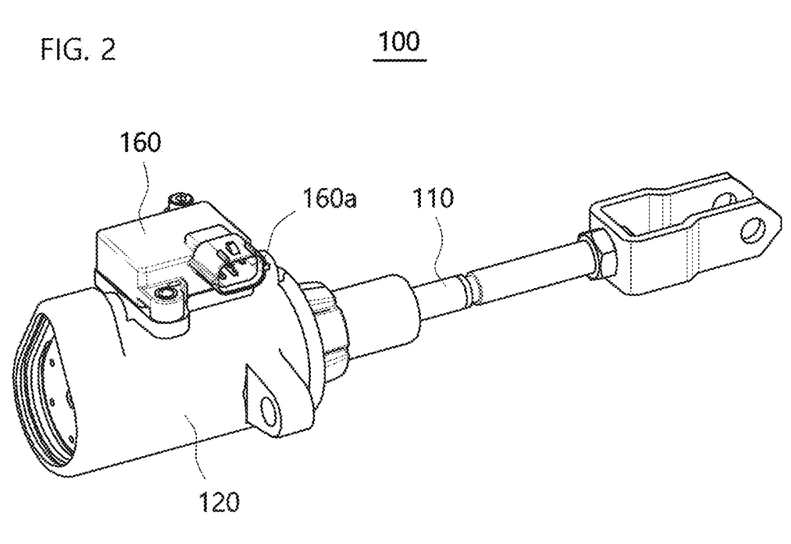
FIG. 2 is a perspective view of the pedal simulator according to one embodiment of the present disclosure.
Figure 3:
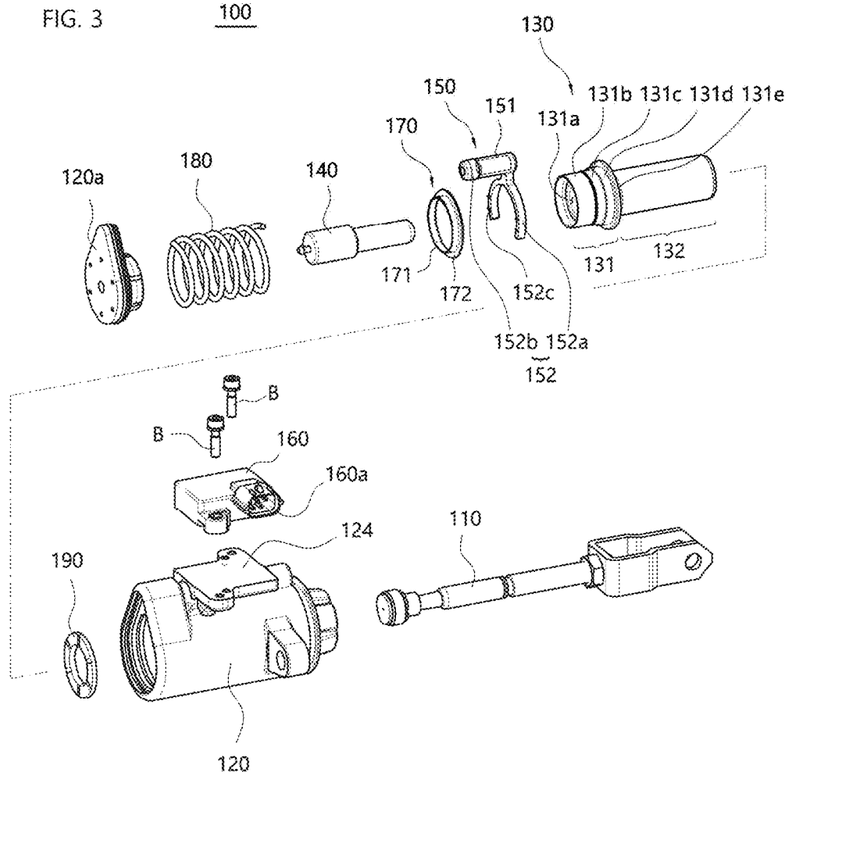
FIG. 3 is an exploded perspective view of the pedal simulator according to one embodiment of the present disclosure.
Figure 4:
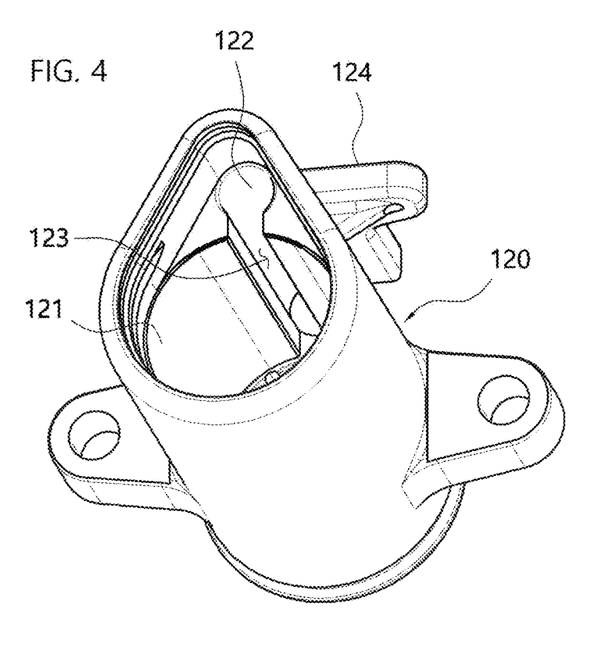
FIG. 4 is a view of a housing of the pedal simulator according to one embodiment of the present disclosure when viewed from the lower side of the front.
Figure 5:
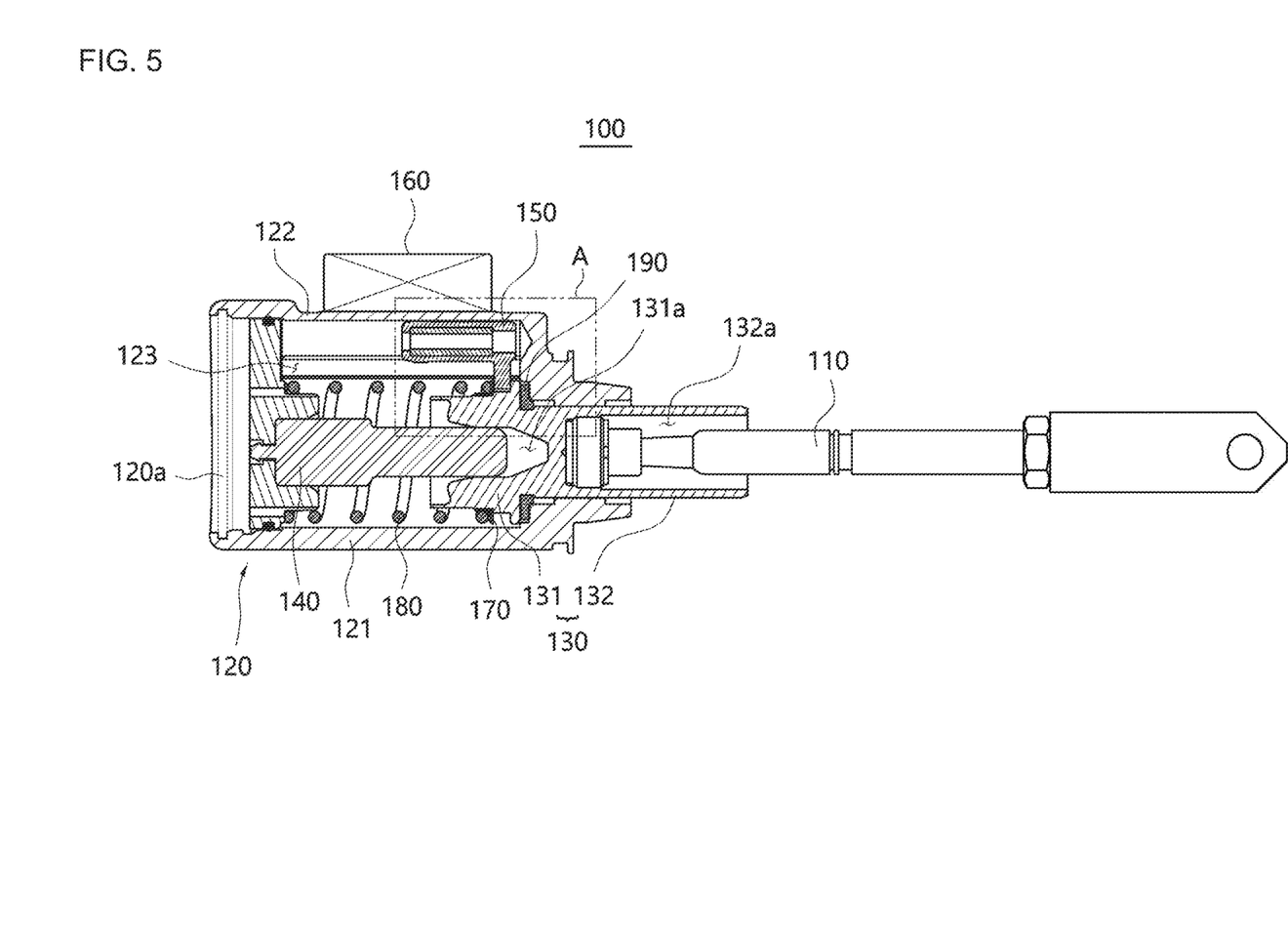
FIG. 5 is a longitudinal cross-sectional view of the pedal simulator according to one embodiment of the present disclosure.

FIG. 2 is a perspective view of the pedal simulator according to one embodiment of the present disclosure, and FIG. 3 is an exploded perspective view of the pedal simulator according to one embodiment of the present disclosure. FIG. 4 is a view of a housing of the pedal simulator according to one embodiment of the present disclosure when viewed from the lower side of the front. Also, FIG. 5 is a longitudinal cross-sectional view of the pedal simulator according to one embodiment of the present disclosure.

Referring to FIGS. 2 to 5, the pedal simulator 100 according to one embodiment of the present disclosure may include an input shaft 110, a housing 120, a piston 130, a reaction force damper 140, a displacement member 150, a sensor 160, a ring-shaped member 170, and a spring 180.

Hereinafter, in relation to relative positions, the housing 120 will be described as being disposed at a front of the input shaft 110. That is, a side near the housing 120 will be described as "front," and a side near the input shaft 110 will be described as "rear." Also, in relation to movement directions, a direction from the input shaft 110 toward the housing 120 is defined as "forward direction," and a direction from the housing 120 toward the input shaft 110 is defined as "rearward direction."

The input shaft 110 is connected to the pedal to behave according to the displacement of the pedal of the vehicle. The input shaft 110 may be disposed to extend to the rear of the housing 120.

The pedal may be the brake pedal 10 of the vehicle. The input shaft 110 may be connected to the brake pedal 10 to move forward or rearward according to the movement of the brake pedal 10. More specifically, the input shaft 110 may move forward when the driver of the vehicle steps on the brake pedal 10.

The housing 120 is provided for the piston 130, the displacement member 150, and the like to be disposed therein. In one embodiment of the present disclosure, the housing 120 may include a first chamber 121 and a second chamber 122.

The first chamber 121 is provided for the reaction force damper 140 and the piston 130 to be disposed therein. The first chamber 121 may have a cylindrical shape. The first chamber 121 may extend in the front-rear direction in the housing 120.

An inner diameter of the first chamber 121 may be formed to correspond to an outer diameter of the piston 130. Accordingly, forward movement or rearward movement of the piston 130 may be stably guided in the first chamber 121.

The second chamber 122 is formed parallel to the first chamber 121 and provided for the displacement member 150 to be disposed therein. The second chamber 122 may have a cylindrical shape. The second chamber 122 may extend in the front-rear direction in the housing 120. More specifically, the second chamber 122 may extend in the front-rear direction parallel to the first chamber 121.

An inner diameter of the second chamber 122 may be formed to have a size that corresponds to the displacement member 150. Accordingly, forward movement or rearward movement of the displacement member 150 may be stably guided in the second chamber 122.

Meanwhile, a long groove 123 may be disposed between the first chamber 121 and the second chamber 122. That is, the first chamber 121 and the second chamber 122 may communicate through the long groove 123.

The displacement member 150 may be disposed to pass through the long groove 123. More specifically, the displacement member 150 coupled to the piston 130 may pass through the long groove 123 and be disposed in the second chamber 122.

Also, the housing 120 may have a sensor arrangement portion 124 for arranging the sensor 160 on an outer surface. The sensor arrangement portion 124 may be disposed on an outer surface of the second chamber 122. For example, the sensor arrangement portion 124 may have the shape of a plate that provides a seating surface on which the sensor 160 may be seated.

The housing 120 and the sensor arrangement portion 124 may be integrally formed. Of course, in other cases, forming the sensor arrangement portion 124 as a separate member and coupling the sensor arrangement portion 124 to the housing 120 may be considered.

In one embodiment of the present disclosure, the housing 120 has a form having an open front end. Accordingly, components such as the piston 130, the reaction force damper 140, and the displacement member 150 may enter the housing 120 through the front of the housing 120 and be disposed therein. In this way, by the housing 120 having the form whose front is open, assembly of the pedal simulator 100 may be easily performed.

In relation to the above, the pedal simulator 100 may further include a housing cover 120a disposed to cover the open front end of the housing 120. In one embodiment of the present disclosure, the housing cover 120a may be coupled to the housing 120 while sealing the open portion at the front end of the housing 120.

At least a portion of a front of the piston 130 is disposed in the housing 120. The piston 130 is connected to the input shaft 110 and moves forward or rearward according to the behavior of the input shaft 110.

Figure 6:
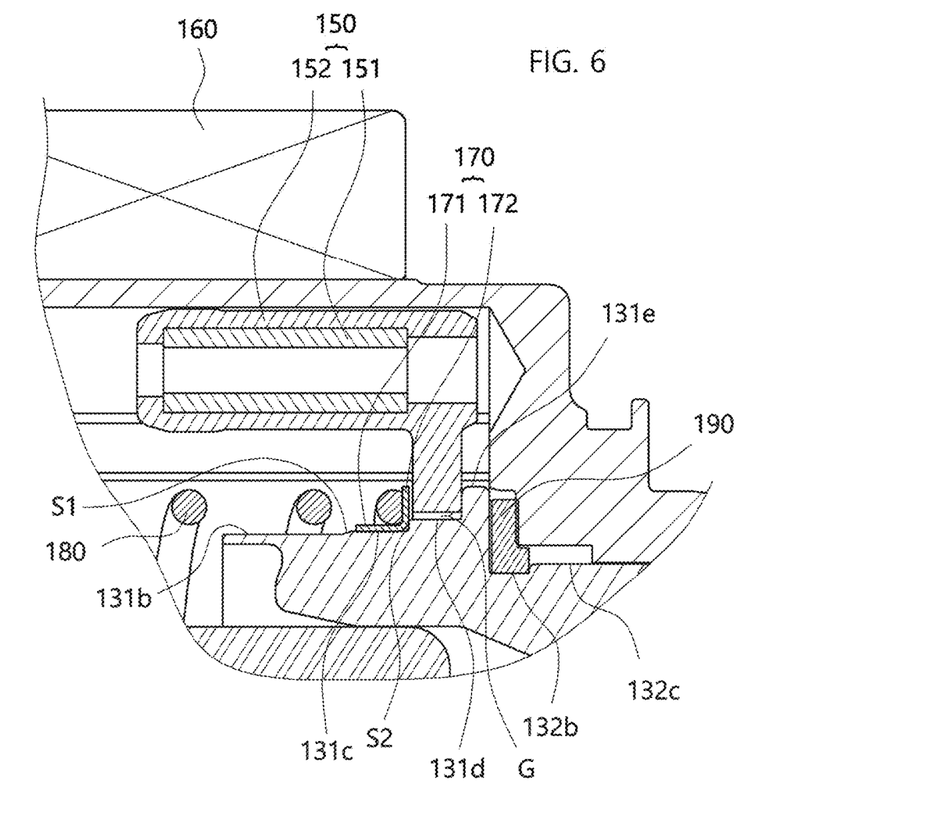
FIG. 6 is an enlarged view of portion A of FIG. 5.

Referring to FIG. 3, FIG. 5, and FIG. 6 which is an enlarged view of portion A of FIG. 5, the piston 130 may include a piston head 131 and a piston body 132.

The piston head 131 is formed in a cylindrical shape. In one embodiment of the present disclosure, the piston head 131 may have a damper groove 131a formed in an axial direction for the reaction force damper 140 to be inserted thereinto. The damper groove 131a may be formed to have a predetermined depth along the longitudinal axis of the piston 130 at a front end of the piston head 131.

The piston head 131 may include a first outer diameter portion 131c, a second outer diameter portion 131d, and a third outer diameter portion 131e.

The first outer diameter portion 131c has a cylindrical shape having a first outer diameter. The first outer diameter portion 131c may have a through-hole that constitutes a portion of the damper groove 131a along the central axis in the longitudinal direction. The ring-shaped member 170 to be described below may be coupled to an outer circumferential surface of the first outer diameter portion 131c.

The second outer diameter portion 131d has a second outer diameter larger than the first outer diameter and is disposed at a rear of the first outer diameter portion 131c. The second outer diameter portion 131d may have a through-hole that constitutes a portion of the damper groove 131a along the central axis in the longitudinal direction.

The second outer diameter portion 131d forms a support step S2 on a boundary with the first outer diameter portion 131c. The ring-shaped member 170, which will be described in detail below, may be supported by the support step S2.

The third outer diameter portion 131e has a third outer diameter larger than the second outer diameter, protrudes radially outward, and is disposed at a rear of the second outer diameter portion 131d. The third outer diameter portion 131e may have a through-hole that constitutes a portion of the damper groove 131a along the central axis in the longitudinal direction.

The third outer diameter portion 131e may form a groove G in an outer circumferential surface of the piston head 131 together with the ring-shaped member 170. More specifically, the third outer diameter portion 131e of the piston head 131 may form the groove G in a circumferential direction of the piston head 131 together with the ring-shaped member 170.

The displacement member 150 may be coupled to the groove G formed by the third outer diameter portion 131e and the ring-shaped member 170.

In one embodiment of the present disclosure, the piston head 131 may further include a fourth outer diameter portion 131b.

The fourth outer diameter portion 131b has a fourth outer diameter smaller than the first outer diameter and is disposed at a front of the first outer diameter portion 131c. The ring-shaped member 170 may enter toward the front of the piston head 131 and be coupled to the first outer diameter portion 131c. The fourth outer diameter portion 131b facilitates entry of the ring-shaped member 170 toward the first outer diameter portion 131c.

A sloped portion S1 is formed between the fourth outer diameter portion 131b and the first outer diameter portion 131c. Here, the sloped portion S1 may be formed so that an outer diameter thereof gradually increases from the fourth outer diameter portion 131b toward the first outer diameter portion 131c. When the sloped portion S1 is formed to have an outer diameter gradually increasing from the front toward the rear in this way, during assembly of the ring-shaped member 170, entry of the ring-shaped member 170 from the fourth outer diameter portion 131b toward the first outer diameter portion 131c may be smoothly guided.

The piston body 132 is connected to the rear of the piston head 131. The piston body 132 is connected to the input shaft 110. The piston body 132 may have a cylindrical shape. The piston body 132 may have a predetermined outer diameter and extend to the rear of the piston head 131.

Referring to FIG. 5, the piston body 132 may have an input shaft groove 132a formed to have a predetermined depth from a rear end toward the front along the central axis in the longitudinal direction. In one embodiment of the present disclosure, the damper groove 131a and the input shaft groove 132a do not communicate with each other.

The input shaft 110 is disposed to be inserted into the input shaft groove 132a. More specifically, a front portion of the input shaft 110 may be disposed to be inserted into the input shaft groove 132a. A front sidewall of the input shaft groove 132a may be disposed in contact with a front end of the input shaft 110, and when the input shaft 110 moves forward according to the movement of the brake pedal 10, the input shaft 110 may press the front sidewall of the input shaft groove 132a, and accordingly, the piston 130 may move forward.

In one embodiment of the present disclosure, the piston body 132 has an extending portion 132c that has a predetermined outer diameter and extends in a cylindrical shape. The above-described input shaft groove 132a may be formed along the central axis in the longitudinal direction of the extending portion 132c.

In one embodiment of the present disclosure, the piston body 132 may further include a diameter reduction portion 132b that is recessed radially inward at a front portion of the extending portion 132c. A support ring 190 may be coupled to the diameter reduction portion 132b. The support ring 190 may prevent a rear portion of the piston head 131 from directly coming in contact with a wall body of the housing 120 and may absorb impact.

The reaction force damper 140 is disposed in the housing 120 and provides a reaction force relative to the forward movement of the piston 130. The reaction force damper 140 provides a force that resists the forward movement of the piston 130, and in this way, the driver of the vehicle may feel a pedal sensation.

The reaction force damper 140 may have any structure that provides an elastic restoring force for resisting the forward movement of the piston 130. Also, the reaction force damper 140 may be formed of a member made of a single material having elasticity.

In one embodiment of the present disclosure, a front end of the reaction force damper 140 is supported by the housing cover 120a, and a rear end of the reaction force damper 140 is supported by the piston 130. More specifically, a rear portion of the reaction force damper 140 may be disposed to be inserted into the damper groove 131a of the piston head 131. Here, the rear end of the reaction force damper 140 may be supported by a sidewall of the damper groove 131a.

The displacement member 150 is connected to the piston 130, disposed in the housing 120, and displaced together with the piston 130. The position of the piston 130 may be identified by detecting a change in the position of the displacement member 150. Since the displacement of the piston 130 occurs corresponding to the displacement of the input shaft 110 connected to the pedal of the vehicle, the displacement of the pedal may be identified by identifying the position of the piston 130.

The displacement member 150 may include a magnet 151. By the displacement member 150 including the magnet 151 in this way, the sensor 160 to be described below may detect a change in a magnetic field according to a change in the position of the displacement member 150.

The displacement member 150 may further include a holder 152 in which the magnet 151 is disposed and which is coupled to an outer circumferential surface of the piston 130. The holder 152 allows the magnet 151 to be coupled to the piston 130 for the magnet 151 to move forward or rearward together with the piston 130 according to the forward or rearward movement of the piston 130.

Referring to FIG. 3, the holder 152 may include a coupling portion 152a and a magnet arrangement portion 152b.

The coupling portion 152a is a portion coupled to the piston 130. In one embodiment of the present disclosure, the coupling portion 152a may be fitted and coupled to the outer circumferential surface of the piston head 131 of the piston 130.

As described above, in a state in which the ring-shaped member 170 is coupled to the piston head 131, the ring-shaped member 170 and the third outer diameter portion 131e of the piston head 131 form the groove G in the circumferential direction of the piston head 131. The coupling portion 152a may have an arc shape inserted into and coupled to the groove G.

The magnet arrangement portion 152b is provided for the magnet 151 to be disposed therein. The magnet arrangement portion 152b is connected to the coupling portion 152a.

In one embodiment of the present disclosure, the magnet arrangement portion 152b may be formed of a cylindrical member in which the magnet 151 is disposed. More specifically, the magnet arrangement portion 152b may have an outer diameter that corresponds to the inner diameter of the second chamber 122.

The magnet arrangement portion 152b may extend in the front-rear direction in the second chamber 122. Here, the magnet arrangement portion 152b may extend in a direction orthogonal to the arc-shaped coupling portion 152a.

Meanwhile, the holder 152 may further have one or more protrusions 152c that protrude toward the ring-shaped member 170 in order to come in contact with the ring-shaped member 170. The protrusions 152c form a contact portion between the displacement member 150 and the ring-shaped member 170 and help the displacement member 150 remain stably fixed without a clearance in the groove G. A plurality of protrusions 152c may be symmetrically provided.

The sensor 160 is disposed to detect the displacement of the displacement member 150. The sensor 160 may detect a change in the magnetic field according to the forward or rearward movement of the magnet 151 of the displacement member 150. For example, the sensor 160 may be a Hall sensor.

The input shaft 110 and the piston 130 move forward or rearward according to the displacement of the pedal of the vehicle, and the displacement member 150 moves forward or rearward together with the piston 130 according to the forward or rearward movement of the piston 130. In this process, a change in the magnetic field occurs according to the displacement of the magnet 151 of the displacement member 150.

The sensor 160 may detect a change in the magnetic field to detect the position of the displacement member 150. The displacement (position) of the pedal of the vehicle may be measured based on the information detected by the sensor 160 in this way.

The sensor 160 may be disposed in contact with an outer surface of the housing 120. In one embodiment of the present disclosure, the sensor 160 may be disposed in contact with an outer surface of the second chamber 122 of the housing 120. More specifically, the sensor 160 may be coupled to the sensor arrangement portion 124 provided in contact with the outer surface of the second chamber 122 of the housing 120.

Referring to FIG. 3, the sensor 160 may be fastened to the outer surface of the housing 120, that is, the outer surface of the sensor arrangement portion 124, through a bolt B. Also, the sensor 160 may have a connection interface 160a for supplying power and transmitting detected information.

The ring-shaped member 170 is coupled to the piston 130 and forms the groove G that allows the displacement member 150 to be coupled to the piston 130. The ring-shaped member 170 may have an inner diameter that corresponds to the first outer diameter and may be fitted and coupled to the first outer diameter portion 131c.

Referring to FIGS. 5 and 6, the ring-shaped member 170 has an inner diameter that corresponds to the first outer diameter, is fitted and coupled to the first outer diameter portion 131c, has a rear supported by the support step S2, and forms the groove G, to which the displacement member 150 is able to be fitted and coupled, together with the third outer diameter portion 131e.

In one embodiment of the present disclosure, the ring-shaped member 170 may include a ring-shaped body 171 and a flange 172.

The ring-shaped body 171 has an inner diameter that corresponds to the first outer diameter. The ring-shaped body 171 may be fitted and coupled to the first outer diameter portion 131c. Here, the ring-shaped body 171 may enter toward the front of the piston head 131 and be coupled to the first outer diameter portion 131c.

As described above, the fourth outer diameter portion 131b having the fourth outer diameter smaller than the first outer diameter of the first outer diameter portion 131c is disposed at the front of the first outer diameter portion 131c of the piston head 131. Since the fourth outer diameter portion 131b has an outer diameter smaller than the inner diameter of the ring-shaped body 171 of the ring-shaped member 170, the fourth outer diameter portion 131b facilitates entry of the ring-shaped body 171 toward the first outer diameter portion 131c.

Also, the sloped portion S1 is formed between the fourth outer diameter portion 131b and the first outer diameter portion 131c, and the sloped portion S1 may have a shape whose outer diameter gradually increases from the fourth outer diameter portion 131b toward the first outer diameter portion 131c. Such a configuration allows the ring-shaped body 171 to be smoothly guided from the fourth outer diameter portion 131b toward the first outer diameter portion 131c during assembly of the ring-shaped member 170.

The flange 172 protrudes radially outward from the ring-shaped body 171. The flange 172 may form the groove G, to which the displacement member 150 is able to be fitted and coupled, together with the third outer diameter portion 131e.

In the pedal simulator 100 according to one embodiment of the present disclosure, the groove G to which the displacement member 150 is able to be coupled is formed through a combination of the ring-shaped member 170 and the third outer diameter portion 131e of the piston head 131. That is, a structure in which a portion of the piston head 131 is formed to be recessed radially inward is provided through the combination of the ring-shaped member 170 and the third outer diameter portion 131e.

Such a configuration allows assembly of the pedal simulator 100 to be performed by placing the piston 130 in the first chamber 121 of the housing 120, placing the displacement member 150 on the piston head 131, and then fitting and coupling the ring-shaped member 170 to the piston head 131. Accordingly, it is easy to place the piston 130 and the displacement member 150 in the housing 120, and efficiency can be secured in terms of assembly and manufacture.

The spring 180 is disposed in the housing 120 to be compressed according to the forward movement of the piston 130. The spring 180 may have a cylindrical shape.

The spring 180 contributes to forming a pedal sensation along with the reaction force damper 140. Also, the spring 180 may serve to move the piston 130 rearward for the pedal to return to its original position when a force stepping on the pedal is released.

In one embodiment of the present disclosure, the spring 180 may have a rear seated on the flange 172 to press the flange 172 rearward. In other words, the spring 180 presses the ring-shaped member 170 toward the support step S2 formed between the first outer diameter portion 131c and the second outer diameter portion 131d. In this way, a coupling state between the ring-shaped member 170 and the piston 130 may be stably maintained.

Figure 7:
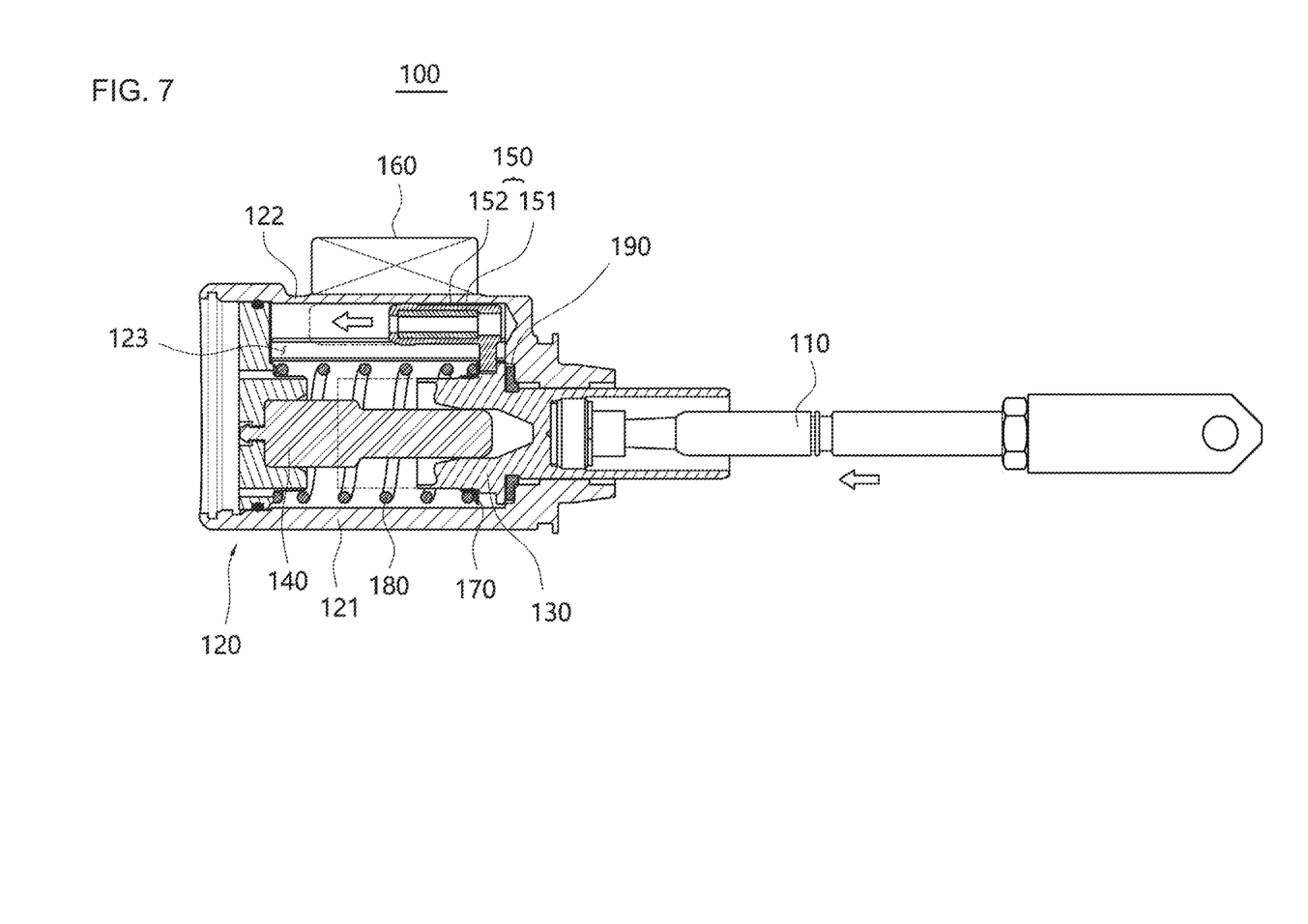
FIG. 7 is a view illustrating a movement of the pedal simulator according to one embodiment of the present disclosure.

FIG. 7 is a view illustrating a movement of the pedal simulator according to one embodiment of the present disclosure.

Referring to FIG. 7, when the driver of the vehicle steps on the pedal, the pedal is displaced forward, and the input shaft 110 connected to the pedal moves forward. Accordingly, the piston 130 connected to the input shaft 110 moves forward. Here, the displacement member 150 coupled to the piston 130 moves forward together with the piston 130.

As described above, the displacement member 150 includes the magnet 151. Therefore, when the displacement member 150 moves forward, the magnet 151 moves forward together, and as a result, a magnetic field around the displacement member 150 changes.

The sensor 160 may detect such a change in the magnetic field. From the change in the magnetic field detected by the sensor 160, the position of the displacement member 150 may be determined, and the positions of the piston 130 connected to the displacement member 150 and the pedal of the vehicle may be determined.

Control of the vehicle may be performed according to the displacement (position) of the pedal of the vehicle that is determined as described above. For example, when the pedal is the brake pedal 10 disposed in the brake system of the vehicle, the magnitude of the brake force that corresponds to the displacement (position) of the brake pedal 10 may be determined. The pump 30, which is configured to generate a hydraulic brake pressure according to the determined magnitude of the brake force, may generate a hydraulic brake pressure that corresponds thereto and may supply the hydraulic brake pressure to the brake 50 disposed at each wheel W through the hydraulic circuit 40 of the vehicle.

According to the above-described configurations, the pedal simulator according to an aspect of the present disclosure has both a component forming a pedal effort and a component detecting a pedal displacement of a vehicle and thus can efficiently detect the displacement of the pedal.

The pedal simulator according to an aspect of the present disclosure can effectively detect a pedal displacement of a vehicle without being connected to the pedal of the vehicle through a link.

The pedal simulator according to an aspect of the present disclosure can be used together with a separate external sensor and thus allows redundancy to be secured in relation to detecting a pedal displacement of a vehicle.

The pedal simulator according to an aspect of the present disclosure provides high assembly efficiency in a manufacturing process through an open front structure of a housing, a stepped structure of a piston, and the like.

It should be understood that the effects of the present disclosure are not limited to the above-described effects, and include all effects inferable from a configuration of the invention described in detailed descriptions or claims of the present disclosure.

Although embodiments of the present disclosure have been described, the spirit of the present disclosure is not limited by the embodiments presented in the specification. Those skilled in the art who understand the spirit of the present disclosure will be able to easily suggest other embodiments by adding, changing, deleting, or adding components within the scope of the same spirit, but this will also be included within the scope of the spirit of the present disclosure.

What is claimed is:

1. A pedal simulator providing a pedal effort to a pedal of a vehicle, the pedal simulator comprising:
a housing;
a piston of which at least a portion of a front is disposed in the housing and which is connected to the pedal to move forward or rearward according to the behavior of the pedal;
a displacement member connected to the piston, disposed in the housing, and displaced together with the piston; and
a sensor disposed to detect the displacement of the displacement member,
wherein:
the displacement member includes a magnet; and
the sensor detects a change in a magnetic field according to a change in position of the displacement member.

2. The pedal simulator of claim 1, wherein the sensor is disposed in contact with an outer surface of the housing.

3. The pedal simulator of claim 1, wherein the displacement member further includes a holder in which the magnet is disposed and which is coupled to an outer circumferential surface of the piston.

4. The pedal simulator of claim 1, wherein the housing includes:
a first chamber in which the piston is disposed; and
a second chamber formed parallel to the first chamber and in which the displacement member is disposed.

5. The pedal simulator of claim 4, wherein a through hole is disposed between the first chamber and the second chamber, and the displacement member is disposed to pass through the long groove.

6. The pedal simulator of claim 1, wherein:
the piston includes a piston head formed in a cylindrical shape and a piston body connected to a rear of the piston head and connected to the pedal; and
the piston head includes a first outer diameter portion having a first outer diameter, a second outer diameter portion having a second outer diameter larger than the first outer diameter, disposed at a rear of the first outer diameter portion, and forming a support step on a boundary with the first outer diameter portion, and a third outer diameter portion having a third outer diameter larger than the second outer diameter, protruding radially outward, and disposed at a rear of the second outer diameter portion.

7. The pedal simulator of claim 6, wherein the piston head further includes a fourth outer diameter portion having a fourth outer diameter smaller than the first outer diameter and disposed at a front of the first outer diameter portion.

8. The pedal simulator of claim 6, further comprising a ring-shaped member having an inner diameter corresponding to the first outer diameter, fitted and coupled to the first outer diameter portion, having a rear supported by the support step, and forming a groove, to which the displacement member is fitted and coupled, together with the third outer diameter portion.

9. The pedal simulator of claim 8, wherein the ring-shaped member includes:
a ring-shaped body having an inner diameter corresponding to the first outer diameter and fitted and coupled to the first outer diameter portion; and
a flange protruding radially outward from the ring-shaped body.

10. The pedal simulator of claim 9, further comprising a spring disposed in the housing to be compressed according to forward movement of the piston,
wherein the spring has a rear seated on the flange to press the flange rearward.

11. A pedal simulator comprising:
a housing;
an input shaft connected to a pedal of a vehicle to behave according to the displacement of the pedal;
a piston of which at least a portion of a front is disposed in the housing and which is connected to the input shaft to move forward or rearward according to the behavior of the input shaft;
a reaction force damper disposed in the housing and configured to provide a reaction force relative to the forward movement of the piston;
a displacement member connected to the piston, disposed in the housing, and displaced together with the piston; and
a sensor disposed in contact with an outer surface of the housing and disposed to detect the displacement of the displacement member,
wherein:
the displacement member includes a magnet; and
the sensor detects a change in a magnetic field according to a change in position of the displacement member.

12. The pedal simulator of claim 11, wherein the displacement member further includes a holder in which the magnet is disposed and which is coupled to an outer circumferential surface of the piston.

13. The pedal simulator of claim 11, wherein the housing includes:
a first chamber in which the piston is disposed; and
a second chamber formed parallel to the first chamber and in which the displacement member is disposed.

14. The pedal simulator of claim 13, wherein a through hole is disposed between the first chamber and the second chamber, and the displacement member is disposed to pass through the long groove.

15. The pedal simulator of claim 11, wherein:
the piston includes a piston head formed in a cylindrical shape and a piston body connected to a rear of the piston head and connected to the input shaft; and
the piston head includes a first outer diameter portion having a first outer diameter, a second outer diameter portion having a second outer diameter larger than the first outer diameter, disposed at a rear of the first outer diameter portion, and forming a support step on a boundary with the first outer diameter portion, and a third outer diameter portion having a third outer diameter larger than the second outer diameter, protruding radially outward, and disposed at a rear of the second outer diameter portion.

16. The pedal simulator of claim 15, wherein the piston head further includes a fourth outer diameter portion having a fourth outer diameter smaller than the first outer diameter and disposed at a front of the first outer diameter portion.

17. The pedal simulator of claim 15, further comprising a ring-shaped member having an inner diameter corresponding to the first outer diameter, fitted and coupled to the first outer diameter portion, having a rear supported by the support step, and forming a groove, to which the displacement member is fitted and coupled, together with the third outer diameter portion.

18. The pedal simulator of claim 17, wherein the ring-shaped member includes:
a ring-shaped body having an inner diameter corresponding to the first outer diameter and fitted and coupled to the first outer diameter portion; and
a flange protruding radially outward from the ring-shaped body.

* * * * *